Feb. 23, 1954  G. H. ROUSE ET AL  2,669,925
AUTOMATIC ELECTRIC TOASTER
Filed April 9, 1948  5 Sheets-Sheet 1

INVENTORS
George Herbert Rouse
and Harry L. Cayler
BY
Pennie, Edmonds, Morton & Barrows
ATTORNEYS

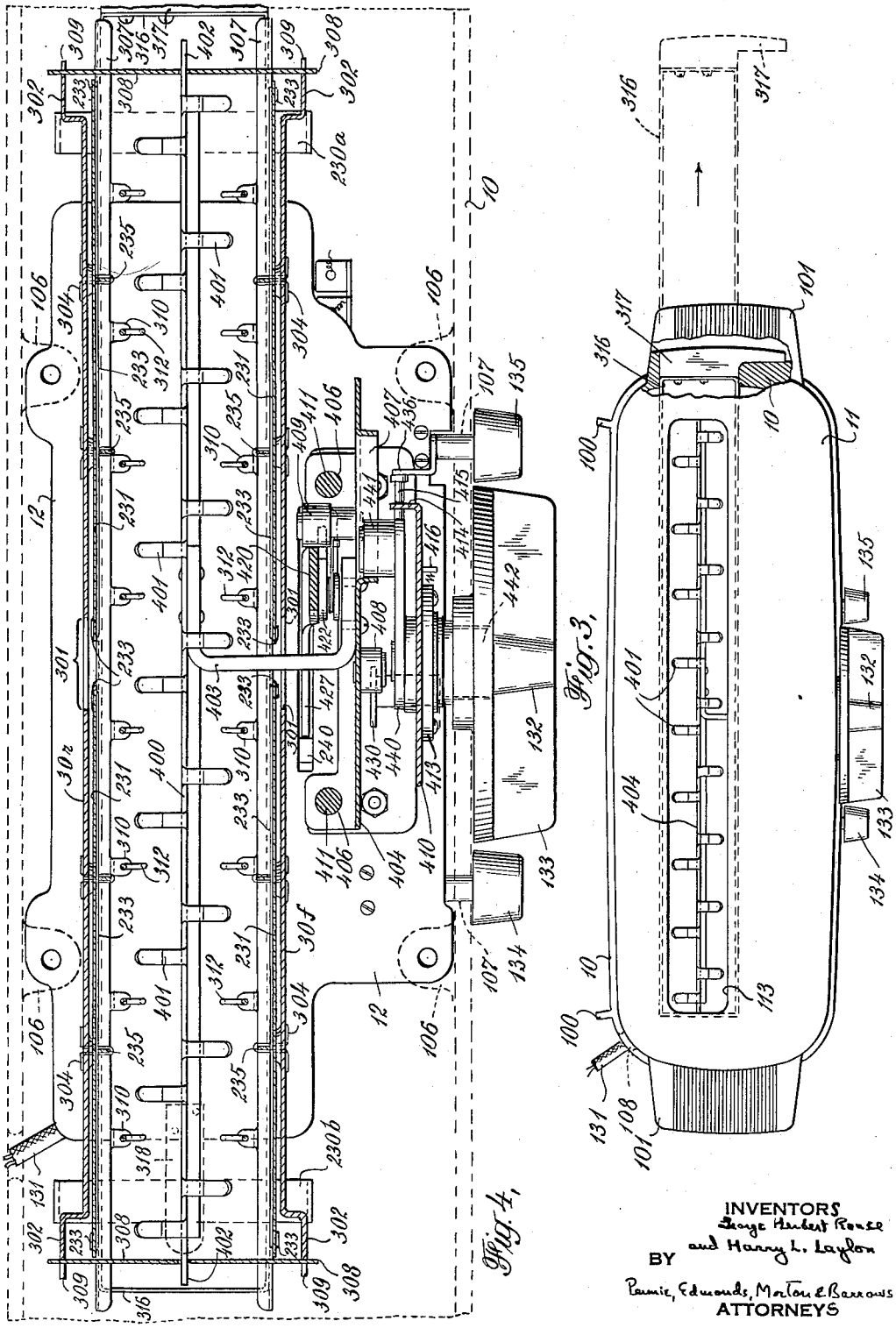

Feb. 23, 1954  G. H. ROUSE ET AL  2,669,925
AUTOMATIC ELECTRIC TOASTER
Filed April 9, 1948  5 Sheets-Sheet 3
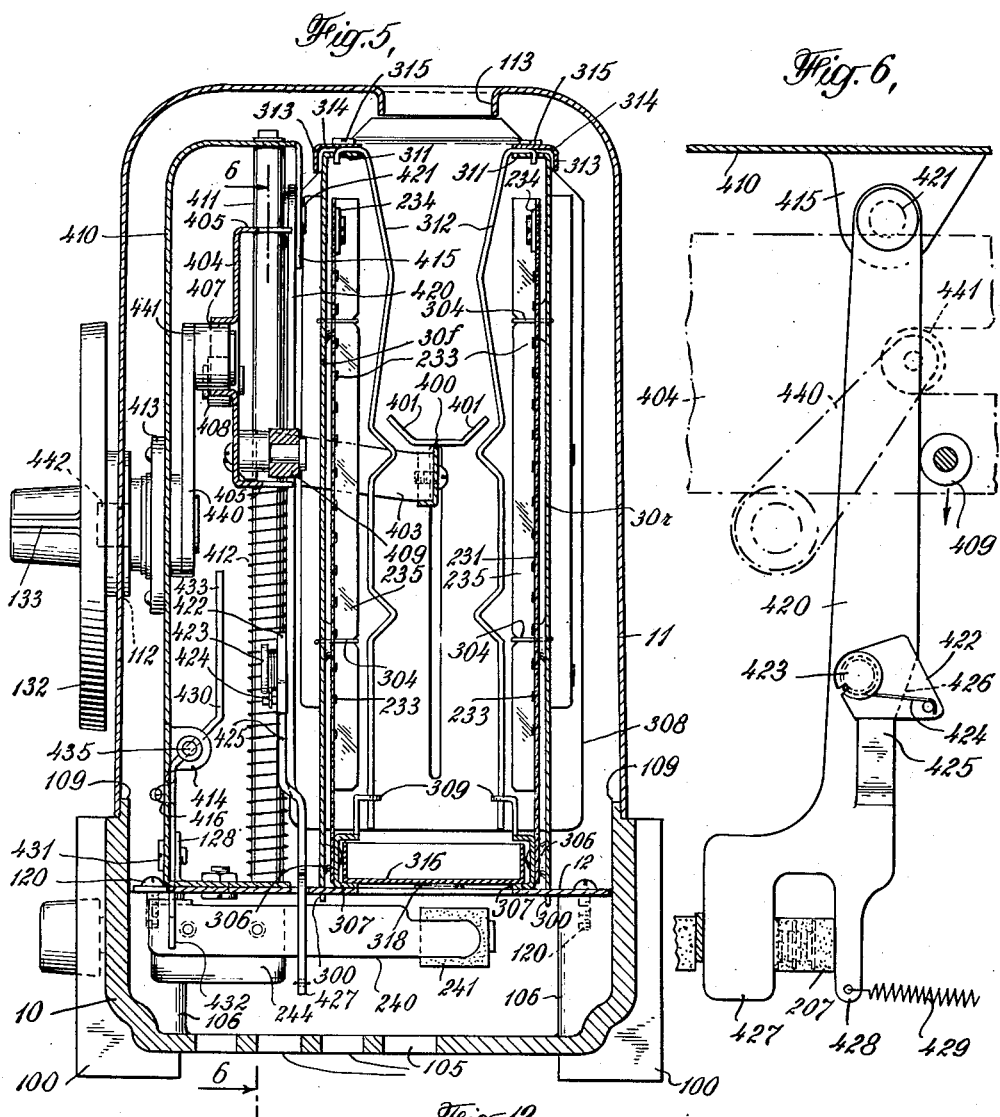
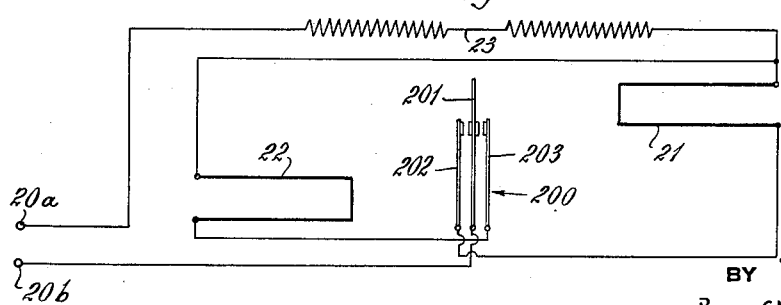
INVENTORS
George Herbert Rouse
and Harry L. Saylor
BY
Rennie, Edmonds, Morton & Barrows
ATTORNEYS Feb. 23, 1954     G. H. ROUSE ET AL     2,669,925
AUTOMATIC ELECTRIC TOASTER
Filed April 9, 1948     5 Sheets-Sheet 4
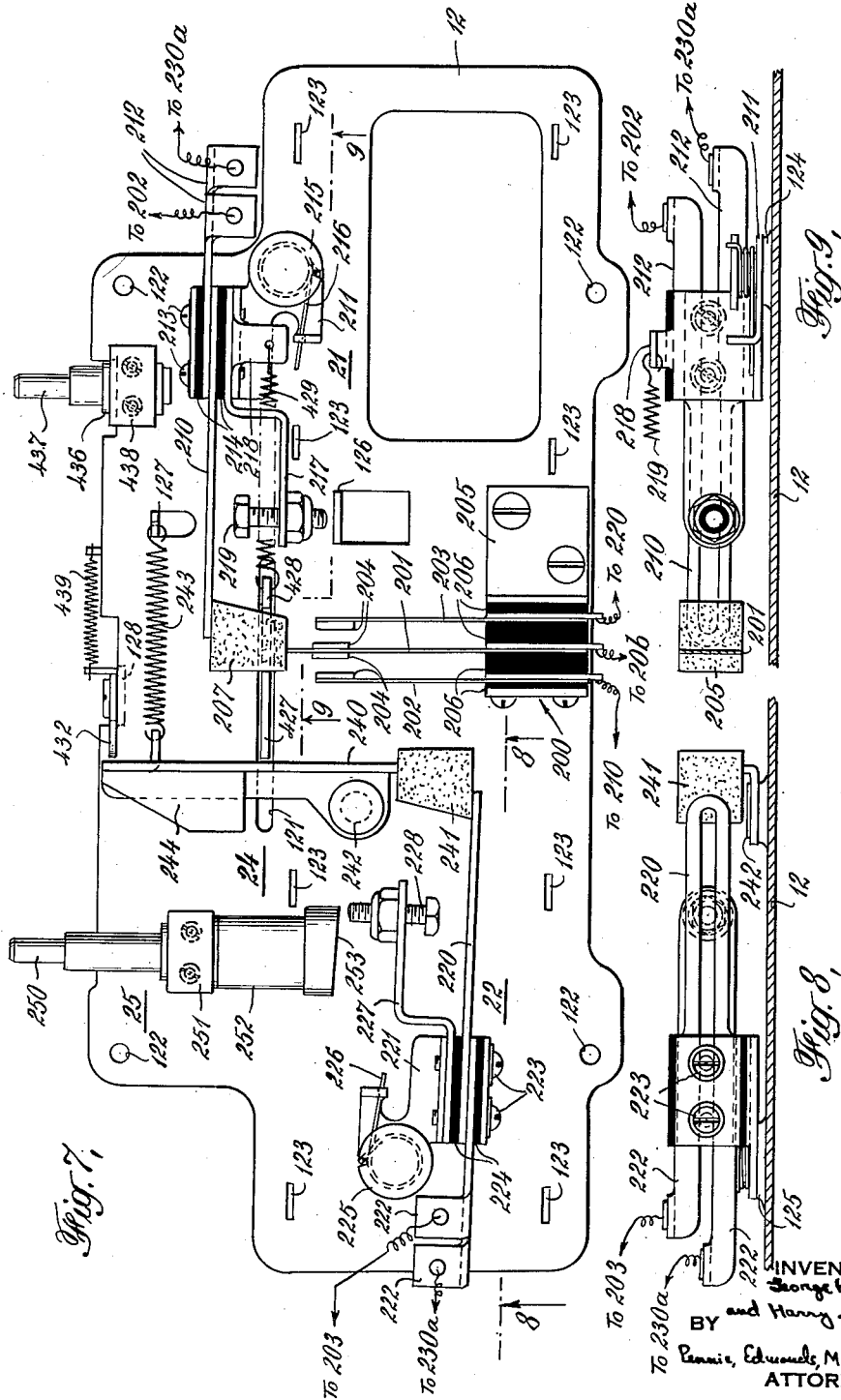
INVENTORS
George Herbert Rouse
and Harry L. Saylor
BY
Pennie, Edmonds, Morton & Barrows
ATTORNEYS

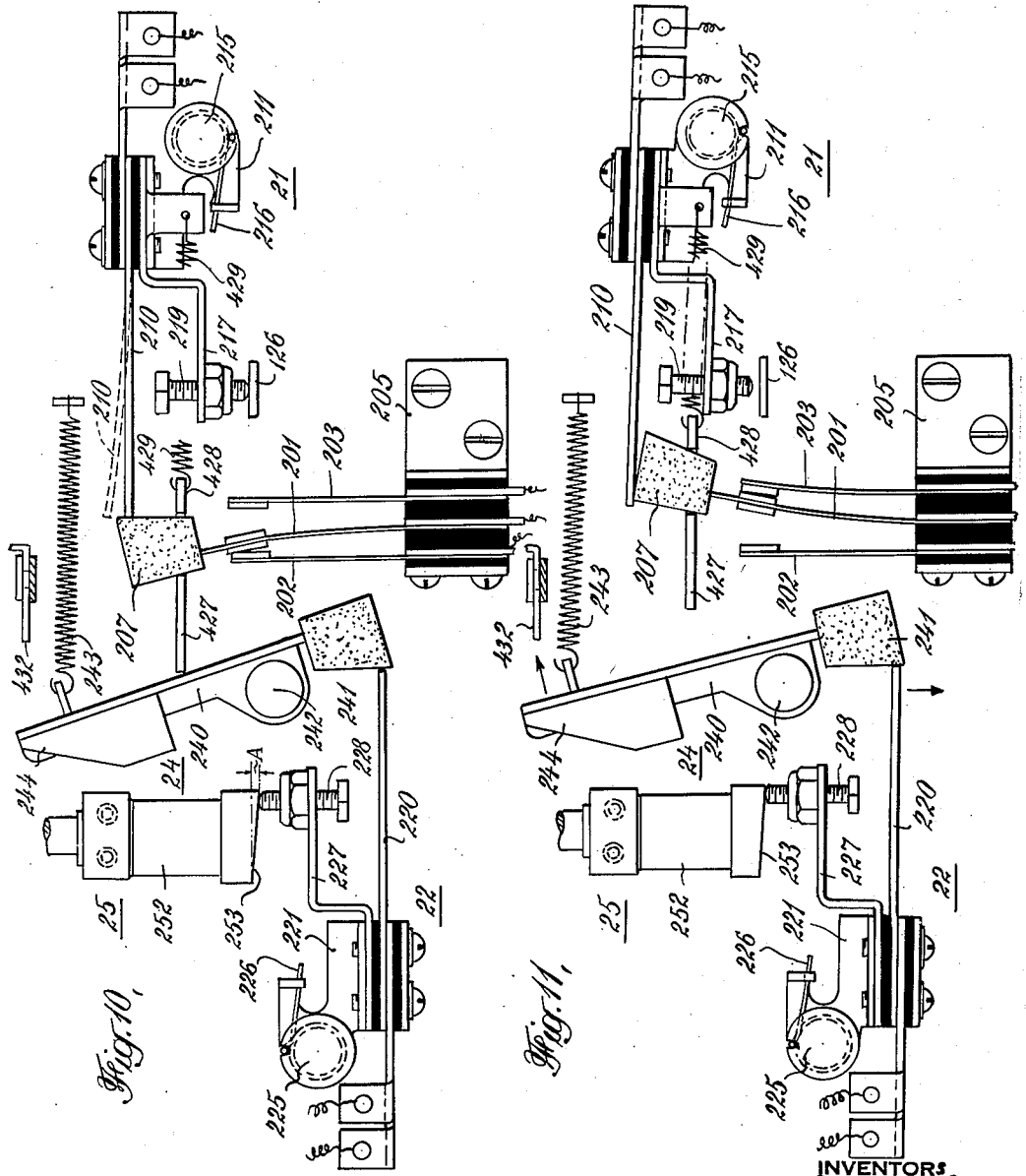

Patented Feb. 23, 1954

2,669,925

UNITED STATES PATENT OFFICE 2,669,925

AUTOMATIC ELECTRIC TOASTER

George Herbert Rouse and Harry L. Laylon, Rochester, N. Y., assignors to Samson United Corporation, Rochester, N. Y.; Emmett L. Doyle and Austin C. Glasser, trustees of Samson United Corporation, assignors to Bickford Bro's. Co., Rochester, N. Y., a corporation of New York Application April 9, 1948, Serial No. 20,064

3 Claims. (Cl. 99—391)

1

This invention relates to automatic electric toasters and, in particular, to a toaster incorporating into the ornamental design patented to one of the joint inventors hereof, Laylon, Des. 148,936, March 9, 1948, an automatic, thermally-timed, bread-lift mechanism embodying the invention of William Thomas disclosed in application Serial No. 699,570, filed September 26, 1946, now Patent No. 2,560,261, dated July 10, 1951, in a novel and inventive combination.

In the prefected automatic appliance of our invention, all electrical and mechanical working parts are mounted on a single base plate. This base plate is supported in a molded plastic, ventilated underbody. The plastic underbody carries integral legs for the support and integral handles for the carrying of the toaster. It also houses the electrical contacts and bimetal trips of the timing mechanism below the base plate and is pierced for the shafts carrying the two control knobs for regulating and terminating, if desired, the automatic toasting cycle.

Immediately above the base plate, and forming a part of the toasting oven lining support, is a pair of trackways for accommodating a removable crumb tray. This crumb tray, when inserted through an aperture in the underbody, not only serves to keep crumbs of toast out of the timing mechanism, but, also, protects the thermal timing elements from the direct radiant rays of the oven heating elements.

Mounted vertically on the base plate are guide rods for raising and lowering the bread lift, a spring-biased, carrier plate to which the bread lift is fastened sliding on these rods.

In order to avoid the awkwardness and difficulty of arm and hand movements required to depress vertically a sliding element against a marked resistance, especially when seated and working more or less at arm's length, we have provided a carrier plate depressing crank and dial mechanism whereby the bread lift can be depressed to the toasting position by a comparatively comfortable and easy twisting motion applied to a generous grip on a large dial.

The four heating elements are of the conventional resistance-wire-on-mica-sheet type, wired in pairs in series-parallel. Each pair in series is arranged side by side in the same plane and opposite a similarly arranged and wired pair, with

2 which it is wired in parallel. The heating elements are backed by two oven wall side plates which, at the top, carry the upper oven lining supports. End plates attached to the side plates complete the enclosure of the toasting oven. These end plates are slotted vertically to accommodate the end guides of the bread lift which run in them. The bread lift itself is long enough to accommodate in tandem two slices of ordinary American baker's bread. The toasting oven structure above the Bakelite underbody is encased in an ornamental, chromium-plated shroud which is directly fastened to the underbody and pierced to accommodate the shaft of the bread lift depressing dial. The top of the shroud is slotted lengthwise, but off center, to register with the toasting oven lining. The displacement of the bread opening from the center line of the shroud arises from the enclosure within it of the bread lift carrier guide rods and associated depressing and trip mechanism as well as the oven proper.

For a detailed description and for the most satisfactory combination of elements making up our perfected automatic toaster, reference is made to the accompanying drawings in which:

Fig. 3 is a top plan view, partly in section, of the toaster illustrated in Fig. 2;

Fig. 4 is a horizontal section, on an enlarged scale, taken on the line 4—4 of Fig. 1 showing the internal mechanism;

Fig. 5 is a vertical section, on the scale of Fig. 4, taken on the line 5—5 of Fig. 1;

Fig. 6 is a partial section on the line 6—6 of Fig. 5 showing in detail the action of the set bar through which cooperation between thermal timer and bread lift action is achieved;

Fig. 7 is a bottom view, on an enlarged scale, of the base plate of the toaster illustrated in Fig. 1, showing the thermal timer mechanism in the "off" position;

Fig. 8 is a partial elevation partially in section on the line 8—8 of Fig. 7;

Fig. 9 is a partial elevation partially in section on the line 9—9 of Fig. 7;

Fig. 10 illustrates the essential timer and trip elements shown in Fig. 7 in the position assumed during the first phase of the toasting operation;

Fig. 11 shows the same elements as Fig. 10 in their positions during the second phase of the toasting operation; and Fig. 12 is a circuit diagram showing the electrical wiring of the toaster.

A. CONSTRUCTION

1. *Base and externals*

Figure 1:
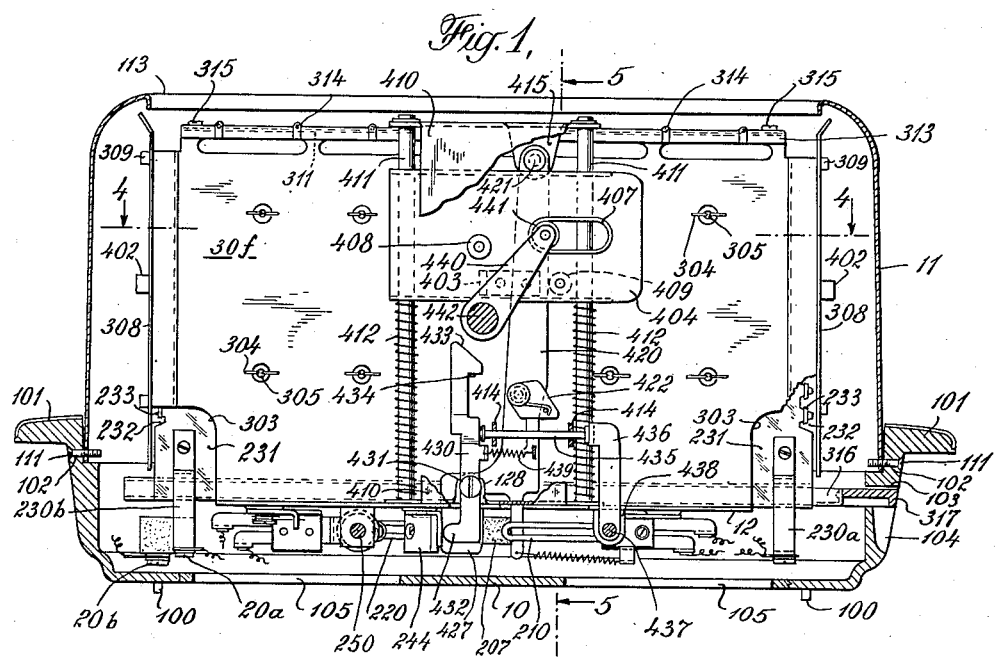
Fig. 1 is a vertical longitudinal section of a toaster constructed according to our invention.

A unitary, molded-plastic underbody 10 (Figs. 1-5, inc.) supports the entire toaster on integral molded legs 100. Handles 101, also integral with underbody 10, are provided for carrying the toaster. The handles 101 extend above the main, box-like portion of underbody 10 and are pierced by holes 102 through which the upper portion of the toaster casing is attached.

At one end of underbody 10, it is pierced by a crumb tray aperture 103 and recessed to provide a crumb tray grip recess 104. The bottom of underbody 10 is pierced by a series of ventilating openings 105 and within the box-portion of the underbody thus ventilated are four symmetrically arranged base plate supports 106. On supports 106 the entire working assembly of the toaster is supported. The front wall of underbody 10 is pierced by two control shaft apertures 107 leading to its interior beneath the top of the base plate supports 106, and the end opposite the crumb tray aperture 103 is pierced by a power supply cord aperture 108.

The toaster casing is completed by a chrominum-plated shroud 11 (Figs. 1, 2, 3 and 5) resting on the upper edge of the box-portion of underbody 10 and positioned by shroud retainer flanges 109 along the inner edge and upward on the underbody wall. The shroud is fastened in place by screws 111 inserted through the apertures 102 in underbody handles 101.

The chromium shroud 11 has an aperture 112 cut through its front face for the bread lift dial shaft and bearing. A longitudinal, inwardly-flanged toast slot 113 is cut through its upper surface. Toast slot 113 is displaced from, but parallel to, the centerline of the upper surface to be in register with the toasting oven as will be more fully described hereinafter.

Neither the underbody 10 nor the shroud 11 has any of the electrical or mechanical working parts of the toaster directly attached to it. Instead, all working components are carried, directly or indirectly, by a base plate 12 (Figs. 1, 4, 5, 7, 8 and 9) fastened on base plate supports 106 by four screws 120.

Base plate 12 is a substantially flat, specially punched, steel supporting member adapted to receive on both its top and bottom surfaces fastening means particularly suitable to mounting each element attached to it. In addition to areas punched out for weight and metal savings, the special punchings of plate 12 include set bar operating slot 121, four base plate fastening screw holes 122, eight oven wall side plate tongue slots 123, a pierced pivot boss 124 on which a timer bimetal is mounted, and second pierced pivot boss 125 on which a second timer bimetal is mounted. A stop 126 for a bimetal adjusting screw, a spring anchor 127 and a latch pivot bracket 128 are bent to the perpendicular from cut outs integral with base plate 12.

Additionally, on the exterior of the assembled toaster (Figs. 2 and 3), appear a power supply cord 131, a bread lift depressing dial 132 furnished with a large, easy-to-grip handle 133, a timer control knob 134 and a bread lift release knob 135.

2. *Wiring and timer*

The power supply cord 131 leads to the power supply terminals 20a and 20b (Figs. 1 and 12) connected, respectively, to the toaster heating element assembly 23 and the center contact arm 201 of a single-pole, double-throw power supply switch 200.

The power supply switch 200 is made up of a center spring blade contact arm 201 and two side spring blade contact arms 202 and 203. Near the end of center blade 201 two contact points 204, one on each side of the blade, are mounted to cooperate with a similar point 204 on the inside of each side blade. The three blades are assembled together and mounted on base plate 12 by mounting bracket 205, insulated from each other and from the mounting by insulation 206. An insulated throw-and-trip block 207 is mounted on the end of center blade 201 by which its position can be controlled. The three blades 201, 202 and 203 are so set that in the absence of external influence 201 is in contact with 202 and out of contact with 203. Appropriate leads, not shown to avoid confusion in the detail drawings, are provided for wiring the switch 200 to the other circuit components as shown in Fig. 12.

The heating element assembly 23 (Fig. 12) includes two U-shaped conductor bars 230a and 230b, each of the four upright ends of which are fastened to a mica sheet 231. The vertical edges of each of the four mica sheets 231 are provided with a series of notches 232 spaced an increasing distance apart from bottom to top. Crossing and recrossing horizontally one face of each mica sheet 231 is a continuous tape-like heating resistance wire 233, wound about the internotch mica lands vertically to minimize the heating wire on the other face of each sheet. The four sheets 231 are arranged in two oppositely disposed, coplanar pairs, the faces of each sheet crossed by the wire 233 facing inward. The lower end of the wire 233 on each sheet 231 at the lower corner of the sheet away from the adjacent coplanar sheet is electrically connected to an upright end of a conductor bar 230. The upper end of the wire 233 on each sheet 231 at the upper corner of the sheet nearer the adjacent coplanar sheet is electrically connected to a jump bar 234, so that the wires 233 on adjacent coplanar sheets 231 are in series between conductors 230a and 230b, the pairs being in parallel. Mica stiffening ribs 235 run vertically along the inside faces of each mica sheet 232 affording means of attaching these sheets to base plate 12 in a manner to be described later.

The bimetal assembly 21 controls the first phase of the toasting cycle timing. It includes a U-shaped bimetal conductor arm 210 assembled on mounting bracket 211. Each leg of bimetal-U 210 is separately electrically connected to a lead terminal 212, and bimetal and terminals are clamped to bracket 211 by screws 213 between insulating blocks 214. Bracket 211 is pivotally mounted on base plate 12 on pin 215 about which it is spring biased in a counterclockwise direction by spring 216. Also mounted on bracket 211 are compensating bimetal 217 and spring anchor arm 218. Bimetal 217 carries an adjustable screw stop 219 which, in cooperation with fixed stop 126, serves to limit the counterclockwise rotation of bracket 211 about pivot pin 215 and, also, to adjust the orientation of that bracket on base plate 12 when stops 219 and 126 are engaged as compensating bimetal 217 reacts to the ambient heat.

The bimetal assembly 22 controls the second phase of the toasting cycle timing. It is similar to assembly 21 and includes a U-shaped bimetal conductor arm 220 assembled on mounting bracket 221. Each leg of bimetal-U 220 is separately electrically connected to a lead terminal 222, and bimetal and terminals are clamped to bracket 221 by screws 223 between insulating blocks 224. Bracket 221 is pivotally mounted on base plate 12 on pin 225 about which it is spring biased in a counterclockwise direction by spring 226. Also mounted on bracket 221 is a compensating bimetal 227 having an adjustable screw stop 228. Screw stop 228 cooperates not with a fixed stop, but with the timing cycle control device to be described later.

The wiring and timer elements are completed by a trip hammer assembly 24, which operates in a manner to be described later to release the depressed bread lift upon completion of the toasting cycle, and a toasting cycle control assembly 25 by which the degree of toasting can be regulated as desired. The trip hammer assembly includes a trip and stop block 241 of insulating material carried on the heel of a pivoted trip hammer lever 240 which is mounted on a base plate 12 by pin 242. This lever is biased about its pivot in a clockwise member by a coil spring 243, the end of which is fixed to anchor 127. Hammer lever 240 carries at its toe end a weighted head 244 to insure positive trip action in releasing the bread lift. The cycle control assembly includes a control shaft 250 journalled in a mounting block 251 fastened to base plate 12. The outer end of shaft 250 passes through an aperture 107 in underbody 10 and carries control knob 134. The inner end of shaft 250 carries a relatively large diameter cylindrical body 252 the inner end face 253 of which is not perpendicular to its axis. The face 253 is positioned to cooperate with stop screw 228 to limit the rotation of bracket 221 counterclockwise about pin 225 under the influence of spring 226. Moreover, screw 228 contacts face 253 at a point near its periphery, so that rotation of shaft 250 will adjust the orientation of bracket 221 on base plate 12. In addition, the position assumed by compensating bimetal 227 under the influence of ambient heat will also adjust this orientation.

The wiring of the current carrying elements follows exactly the diagrammatic showing of Fig. 12. Legends at the lead terminals in Figs. 7, 8 and 9 have been substituted for the leads themselves for pictorial clarity. Briefly described, the power supply cord 131 is connected to the terminals 20a and 20b (Fig. 1). The terminal 20a is, inn fact, a screw threaded into U-shaped conductor bar 230b of heating element assembly 23. A lead connects terminal 20b to center leaf 201 of power supply switch 200. Side leaf 202 is connected to one of the terminals 212 of bimetal assembly 21; the other terminal 212 is connected to conductor bar 230a. Thus when contact is established between contact leaves 201 and 202, current flows in series through bimetal 210 and the heating elements wired between terminals 230a and 230b. Side leaf 203 is connected to one of the terminals 222 of bimetal assembly 22; the other terminal is connected to conductor bar 230a. Thus when contact is established between contact leaves 201 and 203, current flows in series through bimetal 220 and the heating elements wired between terminals 230a and 230b.

3. *Toasting oven stationary elements*

The toasting oven stationary elements are all fastened to base plate 12 through attachment to two oven wall side plates 30f and 30r forming the front and rear boundaries, respectively, of the toasting oven. Both wall plates are fastened to base plate 12 by twisted tongues 300 (Fig. 5) extending through slots 123 (Fig. 7) and have extensive vertical central openings 301 (Fig. 4). The openings 301 are cut away in both plates 30f and 30r to clear heating resistance tape 233 where it passes to the rear of mica sheets 231 as it is wound over edge notches 232 thereof and thus obviate the danger of short circuit through accidental displacement of a mica sheet. A similar function is performed by offset portions 302 at each end of side plates 30f and 30r and by lower corner cut-outs 303 which accommodate U-shaped conductor bars 231a and 231b.

The mica sheets 232 which support and insulate the heating resistances are fastened to side plates 30f and 30r by wire clips 304 which rest in notches on the inner edges of mica stiffening ribs 235 and are spread and clinched outside the adjacent side wall plate after passing through holes 305 therein. Additionally, mica sheets 232 are riveted to side walls 30f and 30r immediately above base plate 12 by rivets 306 which also fasten crumb tray trackways 307 in place.

Slotted end wall plates 308 are fastened by twisted tongues 309 to offset portions 302 at each end of side wall plates 30f and 30r.

Extending inward from the top web of each crumb tray trackway 307 are a plurality of pierced tongues 310. Extending inward from the top of oven side walls 30f and 30r are notched and pierced flanges 311. A plurality of suitably shaped stiff wires 312 form the toast positioning lining for the toasting oven. The bottoms of wires 312 are straight and are inserted through the holes in the pierced tongues 310; the tops are formed into hooks. The ends of the hooks are inserted through the spaced holes in the pierced and notched flanges 311 with the main shaft portion of the wires engaging the corresponding notches. Cap channels 313 having wire accommodating grooves 314 are then screwed to flanges 311 by screws 315 to clamp wires 312 firmly in place.

The stationary elements of the toasting oven are completed by a crumb tray 316 removably inserted in trackways 307. The crumb tray forms the bottom wall of the toasting oven and is made in drawer form removable for ease of cleaning without necessity for tipping the toaster. It is also required to protect bimetal 220, located directly below the oven, from radiant heat therefrom. Removal of crumb tray 316 for cleaning purposes is facilitated by a Bakelite handle 317 fastened to one end thereof by screws. In order to keep tray 316 from sliding out of the toaster when it is being carried, a retainer spring 318 is riveted to base plate 12 and arranged to engage frictionally the tray bottom at the end opposite the handle when the tray is fully inserted.

The inner surfaces of the metal elements forming the boundary walls of the toasting oven, i. e. side walls 30f and 30r, end walls 308, and crumb tray 316, are polished to increase, by reflection, the heating effect of heating element assembly 23. The arrangement of the oven to accommodate a plurality of bread slices in tandem permits the oven to brown toast uniformly on both sides regardless of the number of slices being toasted.

With dual slot toasters of the usual type, when only one slice is being toasted, uniformity on its two sides is not achieved.

4. *Depressible bread lift and associated guides and controls*

A depressible bread lift 400 accommodates the bread to be toasted in the toasting oven. Bread lift 400 is preferably formed as a steel channel (Figs. 4 and 5), the vertical web of which is cut and bent to provide bread supporting fingers 401 and guides 402. Guides 402 run in vertical slots in end plates 308. Bread lift 400 is supported within the oven and attached to the depressible automatic pop-up mechanism of the toaster by a U-shaped steel bracket 403. The bread lift 400 rests on the inner arm of the U of bracket 403. The bottom portion of the U of bracket 403 extends outward from the toasting oven toward the front of the toaster through opening 301 in oven side wall 30f. The outer arm of the U of bracket 403 is fastened to a carrier plate 404.

Carrier plate 404 is the element actually depressed against a spring bias, latched down and released by the toaster automatic mechanism which supplies the pop-up action to the bread lift. Carrier plate 404 has two flanges 405 extending inward from its top and bottom edges. Each flange 405 is pierced by a pair of holes 406, the holes in the upper flange being in vertical registry with the holes in the lower flange. The main web of carrier plate 404 is pierced by a horizontally extending, outwardly flanged opening 407. Rotatably mounted perpendicular to the outer surface of carrier plate 404 is a latch engaging roller 408. Similarly affixed, but protruding slightly further from the inner surface of the carrier plate is the set bar camming roller 409.

Carrier plate 404 is maintained in the desired space relation to base plate 12 through a support bracket 410 which is fastened at the bottom directly to the base plate and is secured at the top to flange 311 on oven side wall 30f. Support bracket 410 is, in profile, a shallow U, the arms of which are pierced to accommodate the fasteners by which it is attached to base plate and oven wall, and also to accommodate and affix two vertical guide rods 411 which pass through the matched pairs of holes 406 in the upper and lower flanges 405 of carrier plate 404.

Coil springs 412 surround each of the guide rods 411 between the lower flange 405 of carrier plate 404 and the portion of support bracket 410 lying on base plate 12 and bias carrier plate 404 upwardly.

The shaft bearing 413 for the bread lift depressing crank is carried by bracket 410 approximately midway in its front face. Near the bottom of bracket 410 are integral, inwardly-bent, pierced tongues 414 to accommodate a toast release plunger and an integral, outwardly-projecting tongue 416 to provide an anchor for the carrier plate latch spring. From the upper portion of bracket 410 there is an integral, downwardly-depending lip 415 to provide a pivot point for a set bar.

A set bar 420 is pivoted on pin 421 from lip 415 at the top of support bracket 410. The set bar is especially illustrated in Fig. 6. About two-thirds the distance downward from pivot pin 421 to the bottom of the set bar, a detent 422 is pivoted on pin 423. Detent 422 is biased to rotate about its pivot 423 by spring 424 in a clockwise direction, its rotation being limited by stop 425 integrally pressed into set bar 420. Detent 422 is located on set bar 420 adjacent to and positioned to cooperate with inclined cam surface 426 on the edge of the set bar that comes in contact with camming roller 409. The lower end of set bar 420 terminates in a two-tyned fork having a wide tyne 427 and a narrow tyne 428. The fork at the lower end of set bar 420 extends through slot 121 beneath base plate 12 to embrace throw and trip block 207 on the end of center switch leaf 201 between its two tynes. A coil spring 429 anchored to spring anchor-arm 218 is fastened to narrow tyne 428 to bias set bar 420 about its pivot in a counterclockwise direction to engage it more firmly with camming roller 409.

A latch lever 430 is pivoted on bracket 128 about horizontal pin 431. Latch lever 430 extends below its pivot and terminates below base plate 12 in a toe 432 interposed in the path of trip hammer head 244. Latch lever 430 likewise extends straight above its pivot a short distance above base plate 12, is then bent inward a sufficient amount to bring it in the path of latch roller 408 on carrier plate 404, and then extends upward a further distance to terminate in a latch cam 433 and latch hook 434. The inwardly bent portion of the upper arm of latch lever 430 is so positioned as to lie in the path of latch release plunger 435 which is slidably mounted in pierced tongues 414 on bracket 410. The end of plunger 435 not in contact with latch lever 430 is in the path of latch release crank arm 436 affixed to rotatable latch release shaft 437 which is journalled in mounting block 438 beneath base plate 12. The outer end of shaft 437 extends through an aperture 107 in underbody 10 and carries bread lift release knob 135. Latch lever 430 is biased in a clockwise direction about its pivot 431 by a coil spring 439 affixed to spring anchor on support bracket 410.

Depressing of carrier plate 404 is effected by rotation of a crank 440. Rotatably mounted on the outer end of crank 440 is a camming roller 441, positioned within opening 407 in carrier plate 404 in rolling engagement with the flanges thereof. At its inner end, crank 440 is affixed to a crank shaft 442 which is journalled in bearing 413. The outer end of shaft 442 protrudes from chromium shroud 11 and has affixed to its outer end bread lift depressing dial 132. Thus by clockwise rotation of dial 132, bread lift 400 is depressed to the toasting position and the automatic action of the associated mechanisms is initiated in a manner hereinafter more clearly explained.

B. OPERATION

The operation of the toaster of our invention is best explained by following the mechanism already described through the sequence of events which takes place in one complete toasting cycle.

1. *Position of elements before a toasting cycle is begun*

Power supply cord 131 is connected to the household mains. The elements beneath base plate 12 are in position shown in Fig. 7. In particular, trip and throw block 207 is held between the broad and narrow tynes 427 and 428 of set bar 420 in a position such that center leaf 201 of switch 200 is not in contact with either side leaf, 202 or 203. Accordingly, no current flows.

Figure 2:
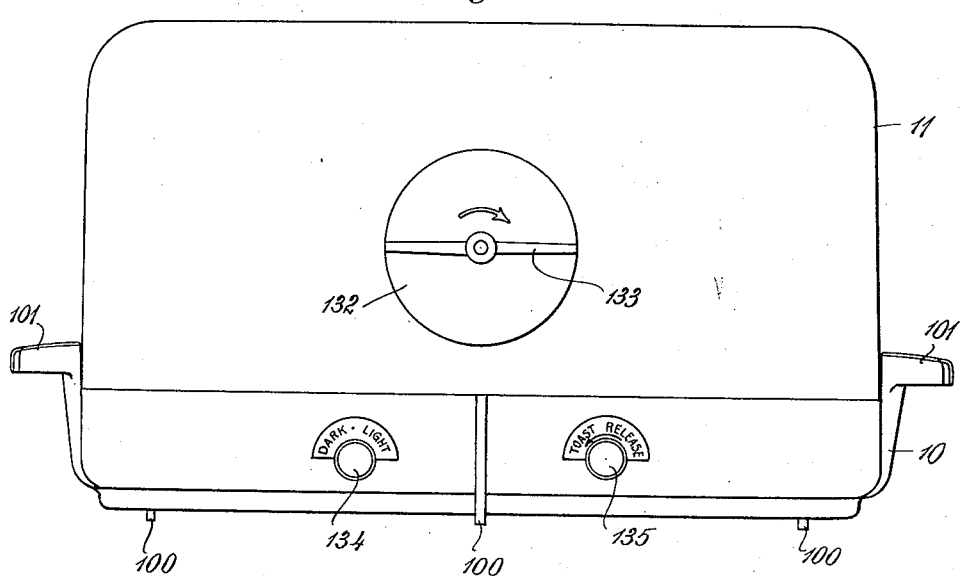
Fig. 2 is a front elevation of the toaster illustrated in Fig. 1.

The position of the elements above base plate 12 is as shown in Figs. 1, 2 and 5. Bread lift 400 within the toasting oven is in its upper position, held there by bracket 403 attached to carrier plate 404 which is supported on guide rods 411 by the released coil springs 412. Handle 133 on bread lift dial 132 is in the horizontal position and crank 440 is in the raised position, bringing camming roller 441 to the left in opening 407. The required position of the lower end of set bar 420 is assured by the position of set bar camming roller 409 on carrier plate 404 which holds set bar 420 against further counterclockwise rotation under the influence of spring 429. Moreover, the outer edge of wide tyne 427 is in contact with trip hammer lever 240 and in a position to hold trip hammer head 244 just out of contact with latch toe 432.

2. Position of elements immediately following the commencement of a toasting cycle Let us suppose that bread to be toasted has been placed on bread lift 400. The toasting cycle is now commenced by rotating bread lift dial 132 clockwise about 90°. This turns crank 440 through the same angle and causes camming roller 441 acting on the flanged edge of opening 407 to depress carrier plate 404. The downward motion of carrier plate 404 compresses springs 412 and causes latch engaging roller 408 to engage latch cam surface 433 forcing the upper part of latch lever 430 to the left. Further downward motion brings latch engaging roller 408 clear of latch cam 433 and the action of spring 439 engages it with latch hook 434. Carrier plate 404 is thus latched in the downward position. Simultaneously, the downward movement of carrier plate 404 causes set bar camming roller 409 to roll down the right hand edge of set bar 420 (Fig. 6) until it reaches detent 422. Roller 409 continuing downward cooperates with detent 422 to cam set bar 420 through a considerable angle of clockwise rotation about its pivot 421.

The effect of this camming of set bar 420 on the elements beneath base plate 12 in contact with its lower end is illustrated in Fig. 10. Throw and trip block 207 has been carried between tynes 427 and 428 to the left bringing center leaf 201 into contact with side leaf 202. The outer edge of wide tyne 427 has rotated trip hammer lever 240 about its pivot 242 to such a distance that trip and stop block 241 is swung clear of bimetal·l 220. Bracket 221 is thus freed to rotate counterclockwise about its pivot 225 under the influence of spring 226 until stop screw 228 and skew face 253 are in contact. The end of bimetal 220 is thus brought inside the toe of trip and stop block 241. Simultaneously, throw and trip block 207 in moving to the left to engage leaf 201 to 202 has cleared the end of bimetal 210, permitting bracket 211 to rotate counterclockwise in its pivot 215 under influence of spring 216 until stop screw 219 is in contact with stop 126. This brings the free end of bimetal 210 inside the toe of throw and trip block 207.

With the timing elements in the positions just described, a circuit is established through bimetal 210 and the heating elements in the oven. The toasting cycle commences. The passage of current through bimetal 210 gradually causes it to curl slightly, as indicated by dotted lines in Fig. 10, clearing the toe of throw and trip block 207. In this connection, note that carrier plate 404 remains latched in the down position so that camming roller 409 is held below cut-away cam surface 426 on the right edge of set bar 420, permitting the set bar to rotate counterclockwise under the influence of spring 429 a greater degree than is possible when the carrier plate is in the "up" position. As soon as bimetal 210 curls sufficiently to release throw and trip block 207, the elements beneath base plate 12 take up the position shown in Fig. 11.

Throw and trip block 207 embraced between tynes 427 and 428 has been carried to the right by action of spring 429, taking center leaf 201 out of contact with side leaf 202 and bringing it into contact with side leaf 203. The circuit through bimetal 210 is, therefore, broken and a circuit established through bimetal 220. Current flowing through bimetal 220 will cause it to curl in the direction of the adjacent arrow in Fig. 11.

When bimetal 220 is curled sufficiently to clear set and trip block 241, large tyne 427 having been moved to the right in slot 121, hammer lever 240 is freed to move in the direction of the arrow adjacent trip hammer head 244 and spring 243 causes hammer 244 to strike latch toe 432 a smart blow. Latch hook 434 will thereupon release latch engaging roller 408 on carrier plate 404. The force of compressed springs 412 will thereupon drive carrier plate 404 to its upper position, carrying with it bread lift 400 and the now toasted bread. During the upward passage of carrier plate 404, set bar camming roller 409 will engage incline cam surface 426, turn detent 422 counterclockwise about its pivot 423 against the action of spring 424 and will cause set bar 420 to resume the position it held before the toasting cycle was begun. As we have seen (Fig. 7) when set bar 420 is in this position, center leaf 201 is in contact with neither side leaf and all electrical circuits are therefore broken. The toasting cycle is complete.

3. Adjustments

The only adjustment provided for normal operation of this toaster is by rotation of shaft 250 by means of which the position of skew face stop 253 can be altered. As can be best understood from Fig. 10, if shaft 250 were rotated through 180° from the position shown, the free end of bimetal 220 would be deeper inside stop and trip block 241 by the amount designated A, and it would be required that bimetal 220 curl through that much greater distance before trip hammer lever 240 was released. By this means the length of the toasting cycle can be varied at will and so, for simplicity's sake, the escutcheon behind the toasting cycle control knob 134 (Fig. 2) is directly marked in terms of degree of toasting.

If an error of judgment has been made in this setting, the bread lift can be brought to the top immediately by turning bread lift release knob 135 in a counterclockwise direction, thus manually disengaging latch hook 134 from latch engaging roller 438. It will be observed, however, that this manual release operation does not reset the trip blocks 207 and 241.

Further adjustments, which must be made with the toaster disassembled, are provided by screw stops 219 and 228, each of which adjusts semipermanently the amount of curl required by the bimetals 210 and 220, respectively, to trip their respective trip blocks 207, 241.

We have explained our invention in detail in terms of its construction and operation in the best manner now known to us, but it is not our intention to be limited to the exact construction selected for illustration, but rather by the appended claims.

We claim:

1. A bread toaster including, in combination, a base, a pair of oppositely disposed vertical side walls supported from and above said base spaced apart to form a toasting oven proportioned to accommodate a plurality of normally dimensioned bread slices disposed edge to edge in a horizontal row, an elongated depressible bread lift disposed to support the bottoms of bread slices within said oven between said side walls above said base, vertical guides outside one of said side walls supported from and above said base, a carrier plate slidably mounted on said guides, spring means urging said carrier plate upward from said base along said guides, a vertical slot in the side wall adjacent said guides, a bracket extending through said slot and connecting said bread lift to said carrier plate, a horizontally extending cam surface on said carrier plate, a crank having its shaft substantially perpendicular to said carrier plate rotatably supported from and above said base, a cam at the outer end of said crank engaging said cam surface, a latch arm supported from said base substantially parallel to said guides and pivoted at the top thereof, a spring detent on said arm spaced from said pivot, timing mechanisms supported from said base beneath said oven engaging said arm below said detent, and a dog on said carrier plate engaging one edge of said latch arm and adapted to engage said detent when said carrier plate is depressed.

2. The combination of claim 1 in which the crank shaft is substantially perpendicular to the carrier plate and the cam at the outer end of the crank consists of a camming roller rotatably mounted about an axis parallel to said crank shaft.

3. The combination of claim 1 which includes a casing supported from and above the base having a first opening through the top thereof substantially coextensive with the top of the oven and enclosing the other elements supported from and above said base, a second opening through said casing opposite said crank shaft and a handle member outside said casing having a portion extending through said second opening and fastened to said crank shaft.

GEORGE HERBERT ROUSE.
HARRY L. LAYLON.

References Cited in the file of this patent
UNITED STATES PATENTS

| Number | Name | Date |
|---|---|---|
| 1,570,502 | Koeb | Jan. 19, 1926 |
| 1,596,080 | Coleman | Aug. 17, 1926 |
| 1,731,118 | Wilson | Oct. 8, 1929 |
| 2,076,774 | Graham | Apr. 13, 1937 |
| 2,264,093 | McCullough | Nov. 25, 1941 |
| 2,284,450 | Sardeson | May 26, 1942 |
| 2,288,748 | Scharf | July 7, 1942 |
| 2,302,117 | Gomersall | Nov. 17, 1942 |
| 2,319,997 | Ireland | May 25, 1943 |
| 2,326,589 | Weeks | Aug. 10, 1943 |
| 2,362,752 | Huck | Nov. 14, 1944 |
| 2,383,673 | Olving | Aug. 28, 1945 |
| 2,404,915 | McCullough | July 30, 1946 |
| 2,404,976 | McCullough et al. | July 30, 1946 |
| 2,407,984 | Heilman | Sept. 24, 1946 |
| 2,582,760 | Schoonmaker | Jan. 15, 1952 |